Dec. 7, 1948.  E. H. CLARK  2,455,559
APPARATUS FOR PRESSING FOOTWEAR AS IT IS CONVEYED
Filed Oct. 10, 1945  5 Sheets-Sheet 1
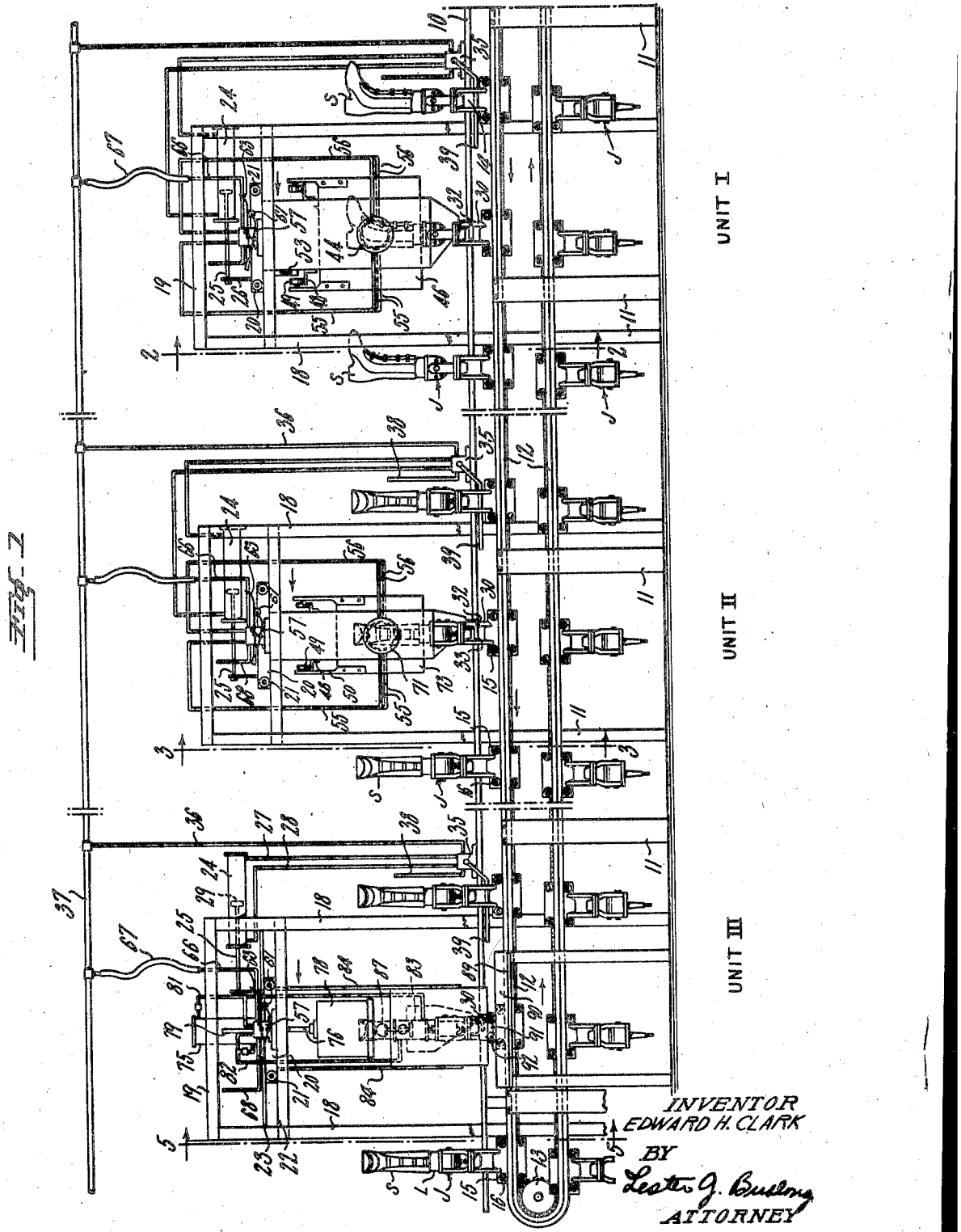
INVENTOR
EDWARD H. CLARK
BY
Lester J. Burling
ATTORNEY Dec. 7, 1948.  E. H. CLARK  2,455,559
APPARATUS FOR PRESSING FOOTWEAR AS IT IS CONVEYED
Filed Oct. 10, 1945  5 Sheets-Sheet 2
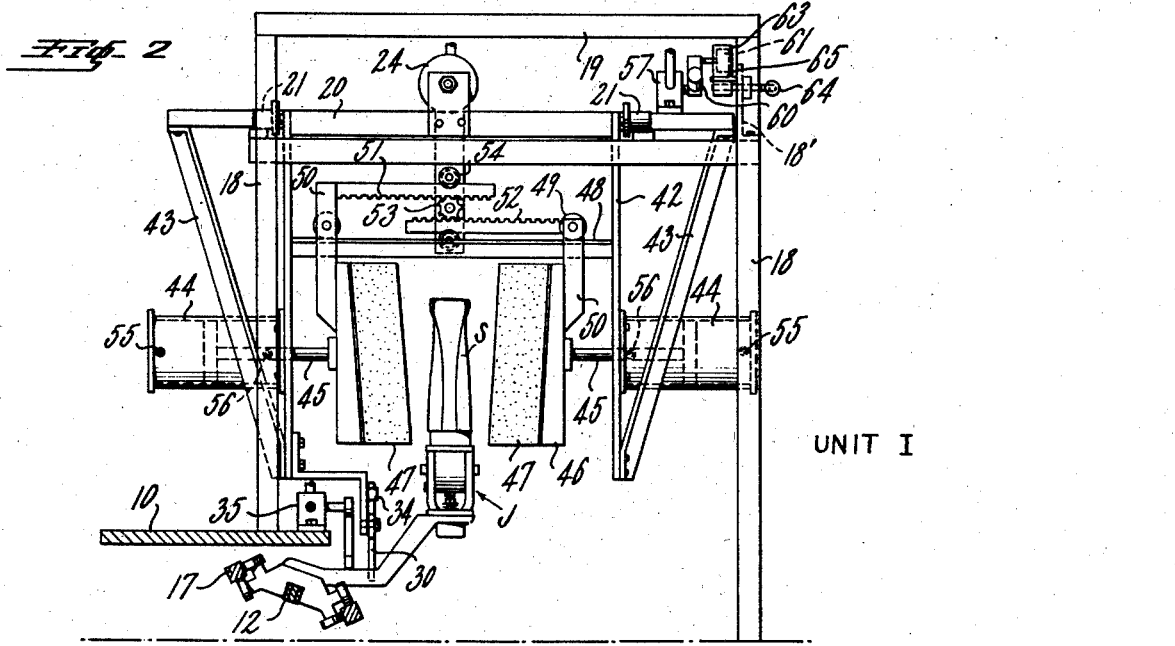
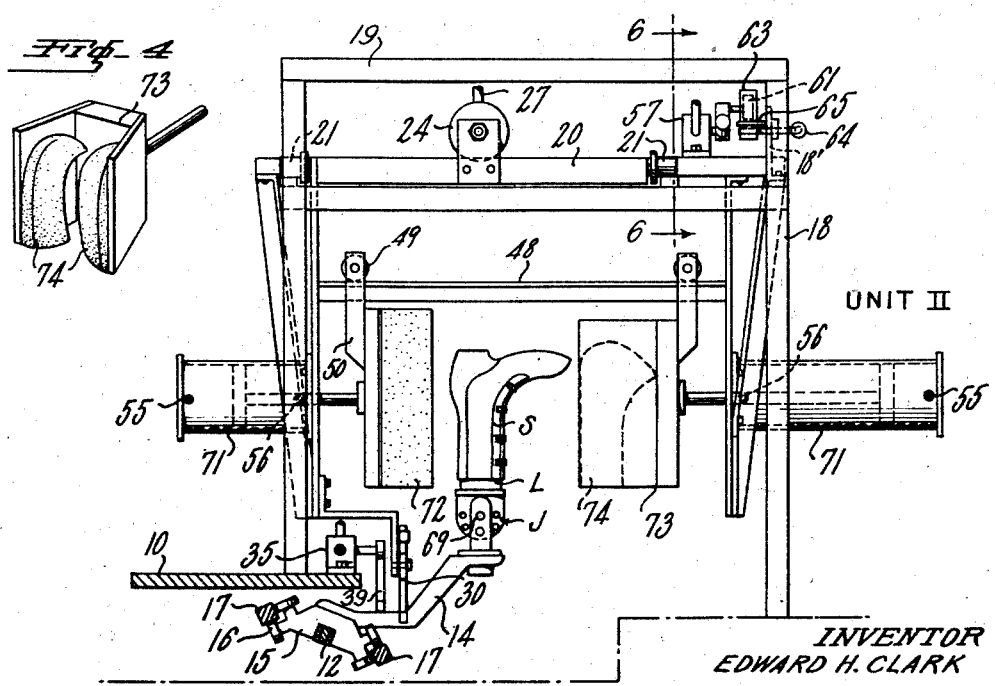
INVENTOR
EDWARD H. CLARK
BY
Lester G. Buslong
ATTORNEY Dec. 7, 1948.  E. H. CLARK  2,455,559
APPARATUS FOR PRESSING FOOTWEAR AS IT IS CONVEYED
Filed Oct. 10, 1945  5 Sheets-Sheet 3
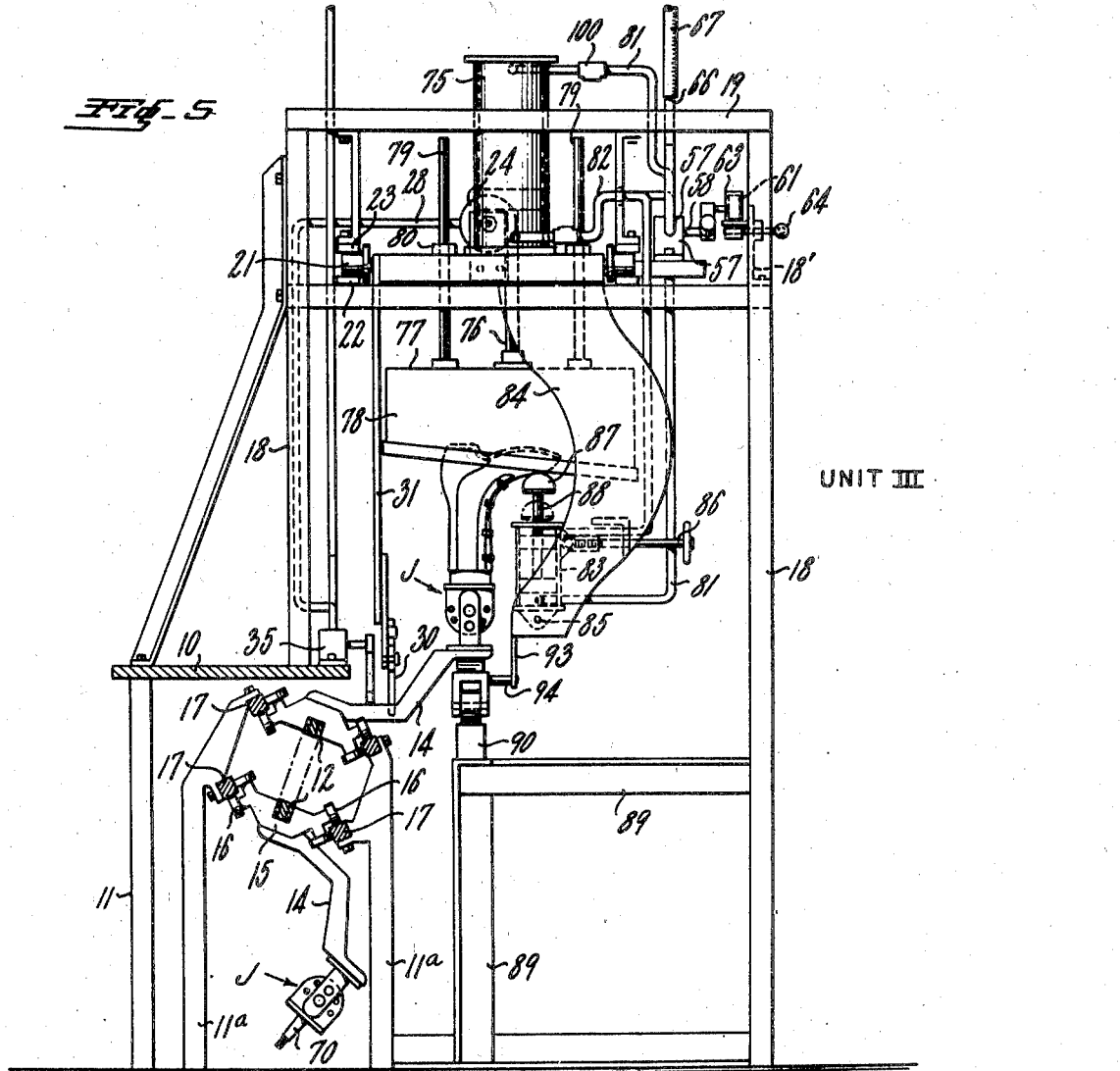
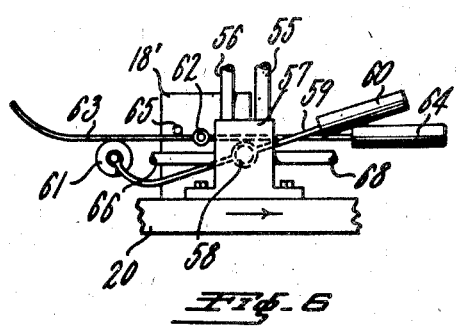
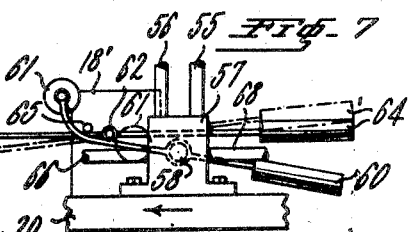
INVENTOR
EDWARD H. CLARK
BY
Lester G. Buslong
ATTORNEY Dec. 7, 1948.                    E. H. CLARK                    2,455,559
             APPARATUS FOR PRESSING FOOTWEAR AS IT IS CONVEYED
Filed Oct. 10, 1945                                       5 Sheets-Sheet 4
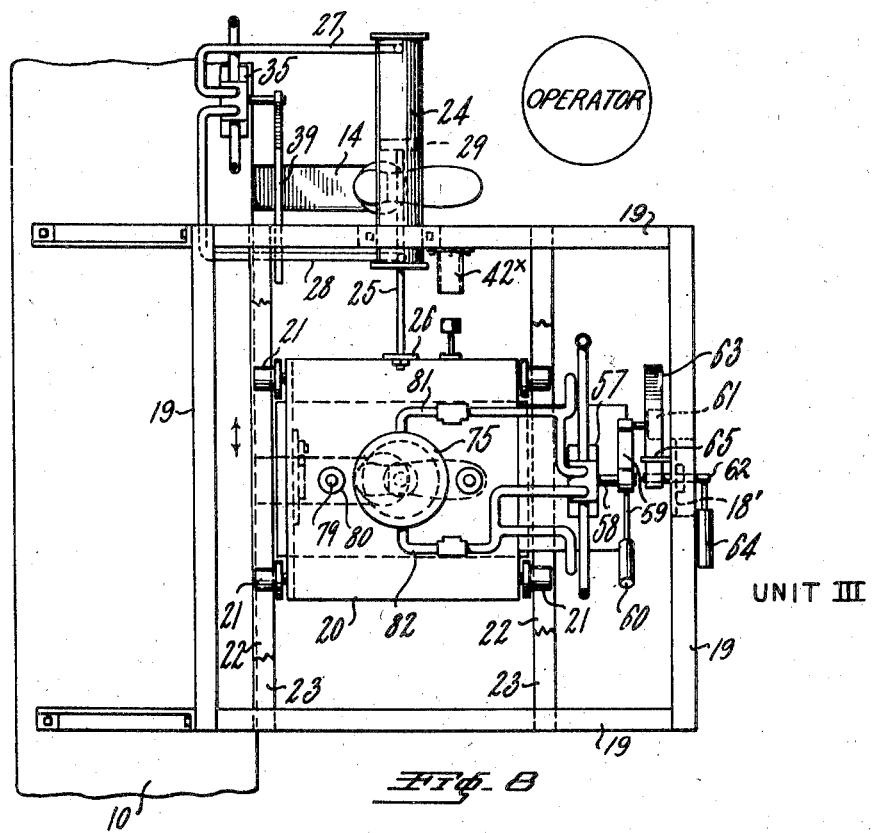
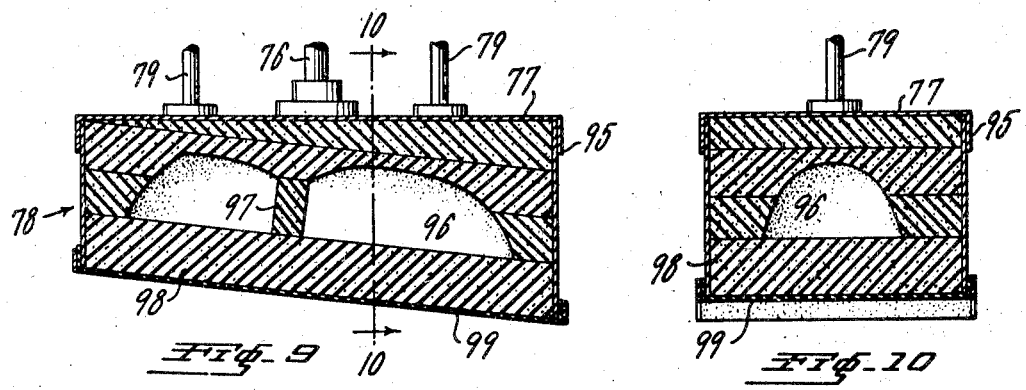
INVENTOR
EDWARD H. CLARK
BY
Lester G. Budlong
ATTORNEY Dec. 7, 1948.  E. H. CLARK  2,455,559
APPARATUS FOR PRESSING FOOTWEAR AS IT IS CONVEYED
Filed Oct. 10, 1945  5 Sheets-Sheet 5
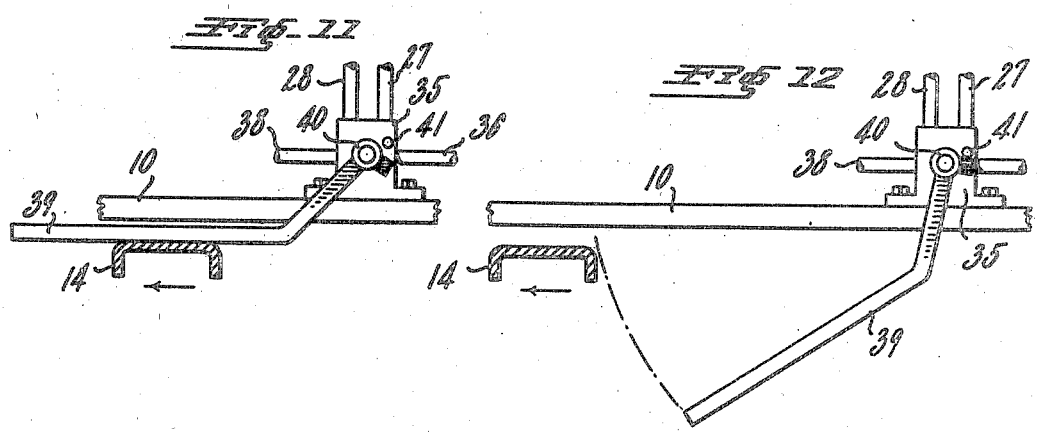
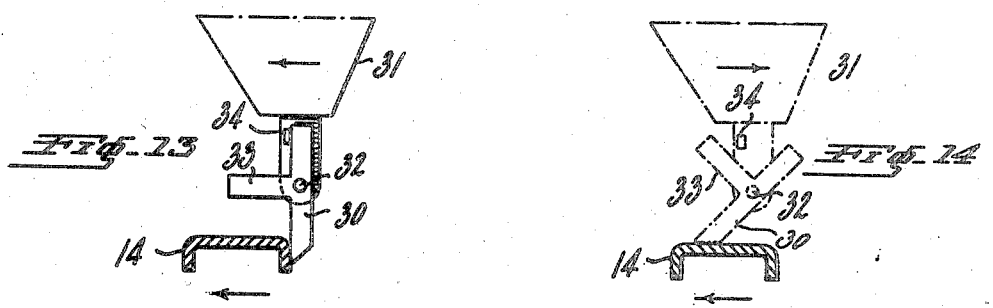
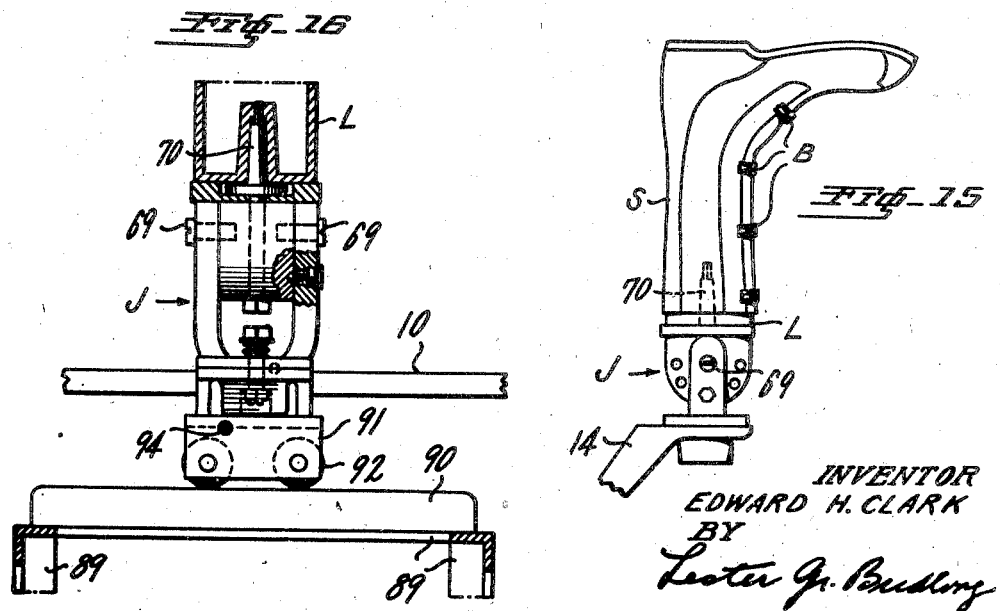
INVENTOR
EDWARD H. CLARK
BY
Lester G. Buidling
ATTORNEY Patented Dec. 7, 1948

2,455,559

UNITED STATES PATENT OFFICE 2,455,559

APPARATUS FOR PRESSING FOOTWEAR AS IT IS CONVEYED

Edward H. Clark, Mishawaka, Ind., assignor to United States Rubber Company, New York, N. Y., a corporation of New Jersey Application October 10, 1945, Serial No. 621,427

13 Claims. (Cl. 12—1)

This application relates to the manufacture of rubber foot-wear and more particularly to power operated yielding means for pressing various portions of lasted footwear firmly against the last.

In the manufacture of rubber footwear the previously shaped rubber parts and rubberized fabric parts are laid in place upon a last, and then all seams must be carefully pressed down because unless this is done defective seams will be produced when the footwear is vulcanized. This pressing down of seams which is called "stitching" has usually been done heretofore manually by rolling and pounding the unvulcanized seams.

It has however been proposed heretofore to use power operated pressing means for pressing a heavy rubber sole against an upper upon a last or to act upon other portions of the footwear, but such power operated pressing means for firmly uniting the seams of lasted footwear has not, so far as I am aware, been used heretofore in operating relation with a footwear assembly conveyor.

For a number of years article assembling conveyors such as shown in the Patten Patent No. 1,953,256 have been employed in the manufacture of rubber footwear, wherein an endless chain conveyor is provided to advance a series of lasted articles adjacent the edge of a long work table, as shown by Patten. As the lasted shoes travel along the table, shoe operators standing or sitting adjacent the table perform successive assembly operations.

The purpose of the present invention is to provide power operated pressing mechanism disposed at one or more points along an article assembling conveyor and adapted to operate in timed relation with the advancing footwear to perform one or more pressing operations on the advancing lasted footwear. In this manner it is proposed to perform by power a number of the more strenuous operations performed heretofore by hand.

The power operated pressing mechanism contemplated by the present invention may be used to perform one or more operations on all types of lasted rubber footwear, and the term shoe as hereinafter used is to be construed broadly as including rubbers, boots, arctics, galoshes and other types of footwear.

A primary feature of the present invention resides in the combination of a power driven conveyor for lasted footwear and a carriage supported for movement back and forth along part of the path traveled by the conveyor in timed relation therewith, and adapted to support power operated means for exerting yielding pressure upon one lasted piece of footwear after another.

Another feature of the present invention resides in mechanism for effecting the movement of the carriage back and forth along the conveyor in timed relation with the successively advancing lasted shoes, and in means for moving the shoe pressing members into and out of engagement with the shoes in timed relation with the carriage travel. It is important that these parts operate so as to apply an approximately constant pressure against the unvulcanized rubber shoe for an appreciable length of time during the travel of the shoe so as to give the rubber time to flow and to set in the new position.

Another feature of the present invention resides in a reciprocating support that is temporarily positioned below a jack to support the same while a strong downward pressure is exerted on the shoe sole.

Another feature of the present invention resides in the construction and arrangement of parts whereby the sole pressing pad used to force the sole with considerable pressure against the last is released from the rough tacky rubber sole to which it tends to cling.

Still another feature of the present invention resides in an article assembling conveyor having two or more operating stations positioned along the conveyor and each of which is provided with power actuated shoe pressing means adapted to operate automatically in timed relation with each advancing shoe.

Although the apparatus of the present invention has been designed to exert a pressing force on various parts of lasted footwear, it may be used in the manufacture of rubber gloves and other rubber articles.

The above and other features of the present invention will be more fully understood from the following description when read in connection with the accompanying drawings wherein:

Fig. 1 is a front view, with some parts broken away, of a work assembly table having a power driven chain conveyor for advancing shoes along the table, and provided with three shoe pressing units embodying the present invention disposed along the table.

Fig. 2 on a larger scale is a sectional view taken on the line 2—2 of Fig. 1, the front of the machine being to the right.

Fig. 3 is a similar view taken on the line 3—3 of Fig. 1.

Fig. 4 is a perspective view of yielding presser pads for engaging the front portion of a shoe as shown in Fig. 3.

Fig. 5 is a sectional view taken on the line 5—5 of Fig. 1.

Fig. 6 is a rear elevation, or reverse to that of Fig. 1, of the cylinder controlling valve used in units I and II, showing the valve control lever with its roller carrying end down, this view being taken approximately on the line 6—6 of Fig. 3.

Fig. 7 is a similar view showing the valve control lever with its roller carrying end up.

Fig. 8 is a top plan view on the third or left hand unit shown in Fig. 1, the front of the machine being to the right.

Fig. 9 is a longitudinal sectional view through the yielding sole pressing pad shown in Fig. 5.

Fig. 10 is a sectional view taken on the line 10—10 of Fig. 9.

Fig. 11 is a front view of an air valve, to be described, showing the operating lever held in its elevated or active position.

Fig. 12 is a similar view showing this lever in its dropped or inactive position.

Fig. 13 is a front view of a pivoted latch, to be described, shown in its active position.

Fig. 14 is a similar view showing the latch in its inactive position.

Fig. 15 is a side elevation of a lasted shoe or arctic mounted upon a supporting jack; and Fig. 16 is a front view with parts in section of a shoe supporting jack and associated truck adapted to take the downward thrust exerted upon the shoe during the sole pressing operation.

In the manufacture of rubber footwear the work has been frequently performed heretofore upon an assembly line where the workers stand or sit along a table and perform successive operations on the lasted shoes as they are advanced by the conveyor. A similar table is used here and is designated by 10 in the drawings. This table which is continuous and relatively long extends throughout the length of the assembly supporting frame and it is used to support the various tools used by the operators, and it serves also as a cover for the jack advancing chain. This long table 10 is supported by the legs 11 and by other structure of the assembly line frame, and in front of the table are advanced the shoes S mounted on lasts L such as aluminum lasts. Each last L is removably mounted on a last support or jack J. These lasts may be advanced by conveyor mechanism somewhat as shown in the above mentioned Patten patent or on the merry-go-round type of conveyor.

The endless shoe conveyor shown in the drawing comprises the chain 12 which travels in an upper and a lower run in the directions indicated by the arrows in Fig. 1, and at the left hand end of the table shown in Fig. 1 is provided the sprocket 13 about which the chain 12 passes. This sprocket is power driven by means not shown. The endless chain 12 has secured thereto at equally spaced intervals along its length, say at twenty-four inch intervals, the transversely extending arms 14 each of which carries a jack J, and each arm 14 is rigidly secured to a truck 15 which is attached to the chain 12. Each of these trucks has the rollers 16 adapted to engage the truck supporting bars 17. The trucks 15 advanced by the upper run of the chain 12 rest as shown in Fig. 5 upon two spaced bars 17 which are inclined somewhat to the horizontal plane, and are disposed below the work table 10, so as to hold their jacks in front of the forward edge of the table where they are readily accessible to the operators disposed along the front of this table between assembly units and in front of the line of advancing jacks. The position occupied by one of the assembly line operators is indicated by the word "operator" enclosed in a circle, see Fig. 8. The trucks 15 advanced by the lower run of the chain 12 are supported by the lower bars 17 so as to cause the jacks J to travel under the table where they are out of the way of the operators. These upper and lower bars 17 are supported by legs 11ª as shown in Fig. 5.

The mechanism so far described by reference numerals is well known and forms no essential portion of the present invention but has been shown and briefly described to make clear the subject matter of the present invention which will now be described.

In the embodiment of the invention illustrated the assembly table 10 has disposed along the same a plurality of operating stations adapted to exert pressure upon different portions of the lasted shoe. It is contemplated that one, two or more of these stations may be provided and in Fig. 1. of the drawing three such operating stations are shown and are designated as "Unit I", "Unit II" and "Unit III." Unit I may be called a side press since its mechanism serves to exert a strong yielding pressure upon the opposite sides of the shoe S. Unit II may be regarded as a front and back press since its apparatus exerts a strong yielding pressure upon these portions of the shoe. Unit III may be regarded as a sole press since it is adapted to exert a strong yielding pressure upon the sole and heel of a shoe to bond them to the shoe upper.

Each of these three pressing units is constructed to perform its function upon one shoe after another while such shoes are advanced at a uniform speed by the chain 12. To accomplish this each pressing unit is provided with a travelling carriage which supports the shoe pressing apparatus and each carriage is supported to travel a short distance with an advancing shoe during the pressing operation thereupon, and is then quickly returned to the initial position to perform a similar operation on the next advancing shoe.

As will be apparent from Fig. 1 each of the units I, II and III comprises a supporting frame attached to the table 10 and extending upwardly above the table and is formed of the uprights 18 connected by the horizontal rails 19. These supporting frames extend outwardly in front of the table 10 as shown in Fig. 5 so as to straddle the conveyor and support the abovementioned carriages above the shoes S which are being advanced by the upper run of the chain 12 in spaced relation to the edge of the table. Each of these supporting frames is provided with a carriage 20 having the flanged wheels 21 adapted to rest upon the spaced horizontal rails 22 so that each carriage may travel back and forth a short distance longitudinally of the conveyor. In order to make sure that a carriage is not lifted upward off of its rails in the construction of unit III, the wheels 21 are confined between the lower rails 22 and the upper rails 23 as shown in Fig. 5.

It is important that each carriage 20 shall move in its forward direction at the same speed as the shoe during the period that its shoe pressing members are acting upon a shoe. Various means could be employed to synchronize the movement of the carriage with that of the upper run of the conveyor. In the construction illustrated in the drawings each of the units I, II and III is provided with a horizontally disposed air cylinder 24 positioned above its carriage 20 and having a sliding piston rod 25 that is secured to a member 26 extending upwardly from the carriage. Compressed air is supplied to one end of each of these cylinders by a pipe 27 and to the opposite end by a pipe 28 so as to act upon the piston 29. When air is supplied to the cylinder 24 by one of these pipes 27, 28 to actuate the rod 25 air will be exhausted from the other end of the cylinder through the other pipe. The arrangement is such that when air under pressure is supplied to the cylinder 24 by the pipe 27 the carriage 20 will be advanced in the direction in which the upper run of the chain 12 is traveling, and for a short distance at the beginning of its travel in this direction, the advance is at a speed in excess of the speed of such chain. The purpose of this excess speed is to cause a dog 30 that is pivotally mounted upon a support 31 projecting downwardly from each carriage 20 to overtake and then abut against the trailing face of a jack supporting arm 14 as clearly shown in Fig. 13. This prevents the carriage thereafter from travelling faster than the shoe disposed below such carriage and thus synchronizes their travel during the period that the pressure pads are acting upon the shoe. Each latch 30 is pivotally secured at 32 to its supporting member 31 and has a laterally extending weight 33 adapted normally to hold the latch so that the upper end thereof rests against a stop 34 upon the member 31.

When a carriage 20 has completed its travel in the forward direction under the action of air supplied by the pipe 27 it is returned to its initial position by introducing air under pressure to the opposite end of the cylinder through the pipe 28. During this return travel the latch 30 will contact the next advancing arm 14 and will rock about its pivot 32 to pass over and slightly to the rear of such arm as will be apparent from Fig. 14. The supply of compressed air to the opposite ends of the cylinder 24 must be timed with the conveyor movement. This is accomplished in the construction shown by mounting upon the table 10 slightly in advance of each of the units I, II and III, a four-way valve casing 35 to which the pipes 27 and 28 are connected as shown in Figs. 11 and 12. This casing also has connected thereto a pressure supply pipe 36 leading downwardly from the overhead main air pressure pipe 37, and a short exhaust pipe 38. The operation of the valve in each casing 35 is controlled by a relatively long rocking lever 39 that is rigidly secured to the valve stem 40 projecting outwardly from a wall of the casing 35. The lever 39 is positioned to hang downwardly in the path of an advancing jack supporting arms 14 so that as the jack advances it will strike such lever and hold it elevated, as shown in Fig. 11, until the arm travels beyond the reach of such lever and drops by gravity downwardly as shown in Fig. 12 to reverse the operation of the valve controlled by this lever. The downward movement of the arm 39 is arrested by a projection upon this lever that strikes the stop 41. It will therefore be seen that the position and length of the arm 39 determine just when the carriage 20 will start its forward movement and the duration of such movement. When the lever 39 drops the carriage 20 will travel rapidly in the reverse direction until this movement is arrested by the shock absorbing stop 42ˣ shown in Fig. 8. The operation just described is the same for all three units.

Each carriage 20, as above stated, is adapted to support shoe pressing mechanism but since each unit operates upon a different portion of the shoe the yielding shoe pressing mechanism is different for each unit. The means for moving the yielding mechanism into and out of engagement with the shoes is similar for all three units.

*Unit I*

Unit I comprising the side press has the construction best shown in Fig. 2 wherein it will be seen that the carriage 20 has extending downwardly therefrom near its opposite sides the cylinder supporting walls 42 having the incline braces 43. Each of these walls has rigidly secured thereto a horizontally extending air operated cylinder 44. These cylinders are disposed at the opposite sides of the shoe S as will be apparent from Fig. 2 and are provided with the sliding piston rods 45. To the outer end of each of these rods 45 is rigidly secured a large metal head 46 having attached to a face thereof a thick pad 47 of sponge rubber such as foam sponge rubber or other yielding material, and the face of each of these pads which contacts the shoe is provided with a tough durable rubber film that will withstand repeated pressing actions against the shoe, as shown in the sole pressing pad of Figs. 9 and 10. Since these thick pads 47 are relatively heavy their weight is preferably supported by the transverse bars 48 secured to the walls 42 and adapted to form runways for the rollers 49 pivotally mounted upon the uprights 50 secured to and extending upwardly from the face plates 46.

It is desirable that one pad 47 be prevented from moving faster than the other as it approaches or leaves the shoe and in order to synchronize the movement of these two pads an upright 50 for one pad has secured thereto the horizontal rack 51, and an upright 50 for the other pad has secured thereto the rack 52. These racks mesh with the idle gear 53 which is rotatably mounted upon a fixed shaft attached to the carriage 20. Rollers 54 retain these racks in engagement with the gear 53. The two pads 47 are moved into engagement with a shoe S by introducing air under pressure into the outer ends of the cylinders 44 through the pipes 55, and these pads are moved away from the shoe by introducing air under pressure into the opposite ends of the cylinder 44 through the pipes 56.

It is apparent that the movement of the pads 47 into engagement with the shoe S must be carefully timed with the forward travel of the carriage 20 so that these pads will engage the shoe only when they are moving forward at the speed at which the shoe is travelling. This control is secured in the construction shown by mounting on each carriage 20 of valve casing 57 which may be constructed similar to the valve casing 35 above described. The casing 57 is mounted upon the carriage 20 near the front of the frame supported by the uprights 18 so that the travel of this valve casing relative to such frame can be utilized to rock a valve stem 58 that projects forwardly from the casing 57, as best shown in Figs. 6 and 7 which are rear views of these parts. This valve stem 58 has rigidly secured thereto the lever 59, provided with the weight 60 at one end and the offset roller 61 (Fig. 8) at its other end. This weight 60 normally holds the lever in the full line position in which it is shown in Fig. 7 where the downward movement of the weight is arrested by means, not shown. As a jack enters a unit (Fig. 1) the arm 14 thereof operates the valve in casing 35, as above described, to cause the carriage 20 to move forward. As the carriage moves quickly forwardly the dog 30 carried thereby (Fig. 13) contacts the arm 14 of the jack already in the unit, and thereafter the advance, that is, movement from right to left in Fig. 1 and from top to bottom of Fig. 8 and in the direction of the arrow in Fig. 6, of the carriage is at the same speed as the speed of advance of the shoe. Roller 61 then advances under plate 63 and is depressed thereby, as shown in Fig. 6, to actuate valve stem 58 to effect movement of pads 47 toward the advancing shoe. The pads remain in contact with the shoe while roller 61 continues its advance. Then the roller passes beyond the forward end of plate 63 and the fixed pin 62 upon a bracket 18' on the frame 18, see the farthermost to the right position of this roller 61 in Fig. 7, so that the roller carrying end of the lever 59 can swing upwardly, under the action of the weight 60, to thereby initiate movement of the pads 47 away from the shoe. The pads will remain in the position in which they are shown in Fig. 2 while the carriage 20 is being retracted, during which time the roller 61 will be carried by the carriage movement rearwardly, that is, in the direction of the arrow in Fig. 7, into the position in which it is shown in dot dash lines at the left hand end of Fig. 7 and finally beyond the tip of the curved roller operating plate 63. This plate 63 is pivoted at 62 and is normally held in the elevated position in which it is shown in full lines in Figs. 6 and 7 by a weight 64 which forces the plate upwardly against the stop 65. The upwardly swinging movement of the roller 61 under the action of the weight 60 is arrested, by means not shown, at a level that will cause the axis of this roll to be in the plane of the upwardly curved tip of the plate 63. Therefore when the roller 61 strikes this tip as the carriage moves rearwardly it will depress the tip momentarily, without effect upon the operation, as it clears the tip, and as the carriage starts its forward travel the roller will engage the under curved surface of this tip to roll thereagainst. The pipes 55 of the cylinders 44 are connected to the pipe 55 of the valve casing 57, and the pipes 56 of the cylinders 44 are connected to pipe 56 of the valve casing. Air under pressure is supplied to the casing 57 by the pipe 66 which is connected by the flexible hose 67 to the main air supply pipe 37. The purpose of providing the air hose 67 is to accommodate the travel of the valve casing 57 back and forth with the carriage 20. The casing 57 has the exhaust pipe 68.

The jacks J shown in the drawings may be of well known construction and are mounted to rotate about the horizontal pivot 69, see Fig. 15, to different angular positions relative to the arm 14, and the shoe last L can be turned about the vertical axis 70, so that the shoe operators can obtain ready access to any portion of the shoe being constructed. It will be noted from Fig. 1 that the shoe S is turned so that its toe points rearwardly to its direction of travel as this shoe is advanced between the presser pads of unit I. The shoe engaging faces of the pads 47 preferably diverge somewhat in an upward direction as shown in Fig. 2 so that the portions of these pads which engage the long wide foot of the shoe will not have to yield as much as the portions of these pads that embrace the leg of the shoe.

Unit II

After this unit I has completed its operation of forcing the side portions of the shoe upper into snug engagement with the shoe last so as to adhere the rubber parts together, the shoe should be turned manually on the axis 70 through an angle of ninety degrees so that the toe points rearwardly; that is transversely to the table 10 as shown in Fig. 3. This is done so that the cylinders 71 provided upon unit II to operate the shoe engaging pads may be supported and operated in a manner very similar to that of unit I. The pressure pad 72 of unit II which engages the back seam portion of the shoe may be very similar to the pads 47 of unit I, as will be seen by comparing Figs. 2 and 3. The other pad element of Fig. 3 which engages the front portions of the shoe is shown in perspective in Fig. 4 as comprising a box 73 containing the spaced rubber pads 74. This construction is employed with the buckle type of shoe shown in Fig. 15 in order to prevent the presser pads from displacing the buckles B. The rubber pads 74 are positioned to straddle the row of buckles B in pressing upon the front portion of the shoe so as not to displace these buckles. The valve control means of unit II for operating the cylinder 71 may be the same as that above described in connection with unit I.

Unit III

After the shoe leaves unit II and before it enters unit III the complete sole and heel are applied by hand to the shoe upper so that the high pressure exerted upon the sole by the mechanism of unit III will serve firmly to unite the sole and shoe upper. The apparatus of unit III as shown operates to exert a downward pressure upon a shoe rather than horizontal pressure on opposite sides of the shoe as in units I and II, and the mechanism of unit III therefore differs substantially from that shown in units I and II.

By referring to Figs. 5 and 8 showing the construction of unit III it will be seen that the carriage 20 has extending upwardly therefrom the compressed air cylinder 75 which is provided with the downwardly extending piston rod 76, to the lower end of which is secured a large heavy metal plate 77 that carries the large sole pressing pad 78. The vertical movement of the plate 77 under the action of the piston rod 76 is further guided by the rods 79 projecting upwardly from the plate 77 through bearings 80 upon the carriage 20. Air under pressure is supplied to the upper end of the cylinder 75 by the pipe 81 and to the lower end of this cylinder by the pipe 82 and the supply of compressed air to the cylinder through these pipes is controlled by a valve casing 57 such as above described. In the case of unit III pipe 81 is connected to the valve pipe 56 and pipe 82 is connected to valve pipe 55.

Since the pad 78 presses with a great deal of force upon the sole of the shoe it is necessary to provide additional means for supporting the last L and jack J during this pressure period, and also to support the toe of the shoe where it extends a substantial distance to one side of the vertical central axis of the last. The toe of the last is supported in the construction shown by providing an auxiliary cylinder 83 that is strongly supported by the spaced downwardly extending curved arms 84 attached to the carriage 20. The lower end of the cylinder 83 is pivotally secured at 85 to the lower portion of the arms 84, and the upper end of this cylinder has secured thereto the hand adjusting screw 86 adapted to be operated to move the toe support pad 87 upon the piston rod 88 towards and from the central vertical axis of the shoe to accommodate different size shoes. The arrangement is such that the pad 87 engages the toe of the shoe as shown in Fig. 5 and supports the shoe from tilting under the downward pressure exerted by the pads 78. The pipe 81 above mentioned is connected to the lower end of the cylinder 83, and the pipe 82 is connected to the upper end of the cylinder 83. The arrangement is such that when the valve controlling lever 59 for this unit III occupies the position in which it is shown in full lines in Fig. 7 the pads 78 and 87 will be withdrawn from the shoe, and when this lever is in the position in which it is shown in Fig. 6 these pads will be advanced towards the shoe. The parts are so arranged however that the toe supporting pad 87 will engage the toe of the shoe to support the same before the pad 78 begins to exert much pressure on the sole of the shoe.

Because of the severe downward pressure exerted upon the shoe by the pads 78 it is found desirable to provide means directly below the jack J for resisting this downward thrust. This is accomplished in the construction shown by providing unit III with the auxiliary supporting frame 89 provided with the rail 90 extending a short distance parallel to the table's edge and which rail forms a runway for a truck 91 having the wheels 92, best shown in Fig. 16. This truck is attached to the lower portion of the arms 84 by the downwardly extending plate 93 having the laterally extending pin 94 that is connected to the truck 91. The arrangement is such that as the carriage 20 travels back and forth it will cause the truck 91 to roll back and forth along the rail 90 to thereby provide a travelling support directly below the jack, so that this truck will help to support the jack during the short period of time that the pad 78 is pressing hard upon the shoe sole.

Because of the heavy pressure the pad 78 is required to exert upon the sole of a large shoe such as the arctic shown the pad must be carefully constructed if it is to give good service. One practical construction to this end is shown in Figs. 9 and 10 of the drawing wherein it will be seen that the metal plate 77 has a downwardly extending flange 95 adapted to form a box having firmly secured therein the composite pad 78 formed of a number of layers of thick sponge rubber which are hollowed out in the central longitudinal portion of the pad as at 96. This hollowed out portion of the pad is preferably provided with the yielding bridge member 97 which prevents too great flexing of the outermost layer 98 of thick sponge rubber during the sole pressing operation. In order to protect the sponge rubber layer 98 from the injurious action resulting from its pressure against the rough sole of the shoe, the outer face of this layer is provided with a protecting layer of thin tough durable rubber or rubber-like material 99.

The speed with which the various air cylinders operate their pistons may be controlled as desired by providing the pipes connected to these cylinders with adjustable check valves such as indicated by 100 in Fig. 5.

After all the operations of making up a shoe such as shown in Fig. 15 are completed, the shoe while remaining on its last is placed in a vulcanizer, and after it is vulcanized it is removed from the last. It is then inspected and made ready for the market.

The power operated sole pressing devices used heretofore, but not in combination with a power driven conveyor, have caused much trouble due to the tendency of the yielding pad to continue to stick to the tacky rubber sole after the operating pressure upon the pad has been relieved, and in many cases hard manual labor has been required to pull the boot or shoe away from the pad. The sole pressing mechanism of the present invention entirely avoids this difficulty. This important result has been accomplished partly by constructing the sole pressing pad 78 so that its sole engaging surface 99 is disposed at an angle to the horizontal plane and to the sole of the shoe as will be apparent from Figs. 5 and 9. The effect of this is to cause the portion of the pad surface 99 that engages the heel to spring away from the heel of the shoe while the toe portion of the shoe still adheres to such surface. The bond between the surface 99 and toe portion of the shoe is then broken by a slight lateral shifting and twisting action of the shoe relative to the pad which is produced by the construction whereby the shoe continues to travel with the chain 12 for a moment after the movement of the carriage 20 in this direction has stopped. The effect of this is to twist slightly the sole of the shoe relatively to the surface of the pad and this is found to be highly effective in breaking the bond between the pad 78 and shoe so that when the pad is elevated by its piston rod 76 it will not lift the lasted shoe up off of its jack.

The operation of the above described apparatus is as follows:

As the footwear or shoes S, which are being formed of unvulcanized rubber and fabric treated with unvulcanized rubber, are made up on the lasts L that move in the direction indicated by the upper arrows in Fig. 1 of the drawing, these advancing shoes are operated upon first by the side press of unit I, then by the front and back press of unit II, and finally by the sole press of unit III. Each of these units comprises a frame that supports an overhead travelling carriage 20. These carriages are provided to support a shoe engaging pad or pads, so that these pads may travel with a shoe for a short distance during the pressure applying operation, and then be returned quickly by the carriage to the starting point in time to engage and operate upon the next advancing shoe. The travel of each carriage back and forth is controlled by a gravity operated lever 39 positioned to hang downwardly in the path of a travelling arm 14 that supports a jack J. The lever controls an air valve which in turn controls the supply of operating air to a piston that moves the carriage back and forth. The arrangement is such that the length of the lever 39 determines how long it will be held elevated by the arm 14, and when it drops the carriage will stop moving forward and return quickly to the starting point. The back and forth travel of the carriage is utilized to control another set of air actuated mechanism including the valve actuating rocking lever 59 which lever controls the supply of air to means provided to move the shoe engaging pad or pads into and out of engagement with the shoe in accurately timed relation with the travel of each carriage. The mechanism of unit I operates to press against the opposite sides of the shoe so as to firmly press the side seams against the last. Unit II serves to form a similar operation on the front and back portions of the shoe, and unit III serves to press the sole of the shoe firmly down against the last so as to secure this sole securely to the shoe upper. After these operations have been performed and such hand operations as may be needed are completed, the last with the shoe thereupon is ready to be placed in a vulcanizer and the shoe vulcanized.

The mechanism of the present invention may, as above stated, be used to perform pressing operations on various types of shoes and thereby avoid the necessity of performing these operations manually, and the amount of pressure exerted upon a shoe may be varied by controlling the pressure of the air supplied by the pipe 37.

Having thus described my invention, what I claim and desire to protect by Letters Patent is:

1. In a machine of the class described, in combination, a power driven conveyor adapted to advance a series of lasted shoes along a predetermined path, a carriage supported to travel a short distance along said path with one shoe and then move in the opposite direction into position to travel with the next shoe, a yielding member on said carriage for exerting pressure upon a shoe, and pneumatic means for moving said member laterally to the conveyor into and out of engagement with an advancing shoe so that the laterally applied force pressing the member against the shoe is pneumatically applied.

2. In a machine of the class described, in combination, a power driven chain conveyor having last supporting means secured to the chain at spaced intervals, a carriage supported to move back and forth along the chain, means for moving the carriage forward a short distance with the chain and then returning the carriage to its initial position, and yielding mechanism upon the carriage and provided with means for moving it laterally to the conveyor into and out of engagement with lasted foot-wear advanced by the conveyor and with a force that controls the pressure upon the foot-wear.

3. In a machine of the class described, in combination, a power driven chain conveyor having last supports secured to the chain, a carriage supported to move back and forth along the chain, means for moving the carriage forward a short distance and then returning the carriage including a latch adapted to engage the successive supports to synchronize the movement of the carriage and shoe, and yielding means upon the carriage for acting upon the shoe.

4. In a machine of the class described, in combination, a power driven conveyor adapted to advance a series of lasted shoes, a carriage having means for moving it back and forth along part of the conveyor path, a sole pressing pad and a toe support on the carriage, and means operable in timed relation with the conveyor movement (1) to advance the carriage with a shoe (2) move the toe support against this shoe and (3) force said pad against the sole of this shoe.

5. In a machine of the class described, in combination, a power driven conveyor adapted to advance a series of lasted shoes, a carriage having means for moving it back and forth along part of the conveyor path, a sole pressing pad and a toe support on the carriage, and pneumatic means for moving the sole pressing pad and toe support into and out of engagement with the successive shoes.

6. In a machine of the class described, in combination, a power driven conveyor adapted to advance a series of lasted shoes along a predetermined path, a carriage supported to move back and forth along part of said path, a sole pressing pad upon the carriage, means for moving the carriage in timed relation with the shoe travel, and means for moving the pad into and out of engagement with the sole of a shoe in timed relation with the shoe movement so as to complete disengaging the pad from the sole after the carriage has stopped its forward movement so as to twist the sole by its travel to free the pad from a tacky sole.

7. In a machine of the class described, in combination, a power driven conveyor adapted to advance a series of equally spaced lasted shoes along a predetermined path, a carriage supported to move a short distance back and forth along said path, mechanism for moving the carriage in timed relation with the successive shoes, a shoe pressing pad upon the carriage, pneumatic means for moving the pad laterally to the conveyor towards and from a shoe and against the shoe with a sustained pressure and provided with an actuating valve that is controlled by an element of the moving carriage.

8. In a machine of the class described, in combination, a power driven conveyor adapted to advance a series of lasted shoes along a predetermined path, a carriage supported to move back and forth along part of the said path, a sole pressing pad upon the carriage, means for moving the carriage in timed relation with the shoe travel, means for moving the pad into and out of engagement with the sole of an advancing shoe, and a fixed runway positioned to form an added support for taking the pressure upon the last while the pressing pad is acting upon said sole.

9. In a machine of the class described, in combination, a power driven conveyor provided with a series of last supports adapted to carry lasted shoes, a carriage supported to travel back and forth along part of said path, pneumatic means for advancing the carriage, latch means operable to synchronize the movement of the carriage with that of a last support, and a shoe pressing pad upon the carriage and supported for movement into and out of engagement with a shoe.

10. In a machine of the class described, in combination, a power driven conveyor provided with a series of last supports adapted to carry lasted shoes, a carriage supported to travel back and forth along part of said path, means for moving the carriage back and forth in timed relation with the shoe travel, oppositely spaced presser pads carried by the carriage, and means for operating these pads to move them into and out of engagement with the opposite sides of a shoe upper.

11. In a machine of the class described, in combination, a power driven conveyor adapted to advance a series of lasted shoes along a predetermined path, a carriage supported to travel a short distance along said path with one shoe and then move in the opposite direction into position to travel forward with the next shoe, a pad supported by the carriage and adapted to conform to a large portion of a shoe, and mechanism on the carriage for moving the pad laterally to the conveyor into firm engagement with the shoe with a pressure that is sustained while the carriage travels a distance of some inches.

12. In a machine of the class described, in combination, a power driven conveyor adapted to advance a series of lasted shoes along a predetermined path, a carriage supported to travel a short distance along said path with one shoe and then move in the opposite direction into position to travel forward with the next shoe, a sole and heel engaging pad supported by the carriage, and mechanism on the carriage for pressing this pad firmly against the sole and heel of the shoe with a force that is sustained while the carriage travels a distance of some inches.

13. In a machine of the class described, in combination, a power driven conveyor adapted to advance a series of lasted shoes along a predetermined path, a carriage supported to travel a short distance along said path with one shoe and then move in the opposite direction into position to travel forward with the next shoe, a pair of pads supported by the carriage on opposite sides of a shoe, and mechanism for moving these pads toward each other into engagement with opposite sides of the shoe with a force that is sustained while the carriage travels a distance of some inches.

EDWARD H. CLARK.

REFERENCES CITED

The following references are of record in the file of this patent:

UNITED STATES PATENTS

| Number | Name | Date |
| --- | --- | --- |
| 1,539,922 | Thompson | June 2, 1925 |
| 1,748,975 | Craig | Mar. 4, 1930 |
| 1,895,921 | Ellis | Jan. 31, 1933 |
| 2,115,175 | Miller | Apr. 26, 1938 |